July 9, 1957 R. B. DAVIDS 2,798,467
SCAVENGING AND EXPANSION VOLUME EXTENDING TRAP
MECHANISM FOR INTERNAL COMBUSTION ENGINES
Filed April 28, 1954 2 Sheets-Sheet 1
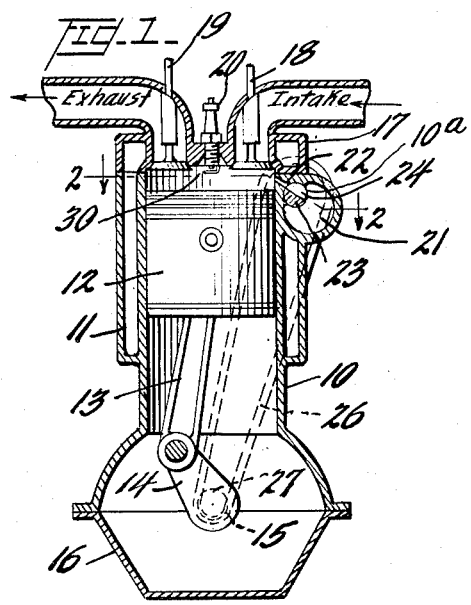
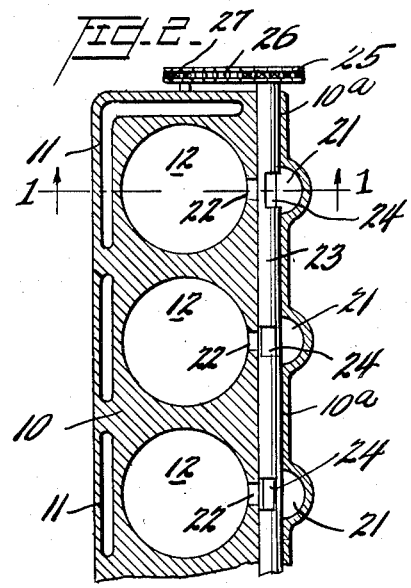
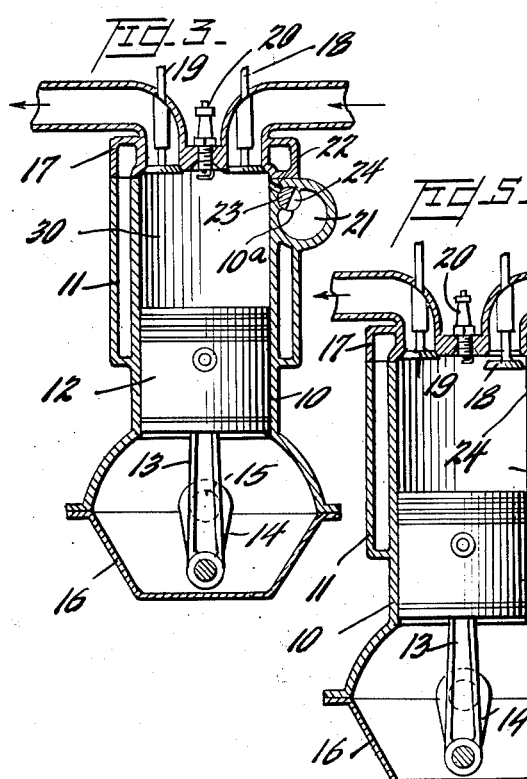
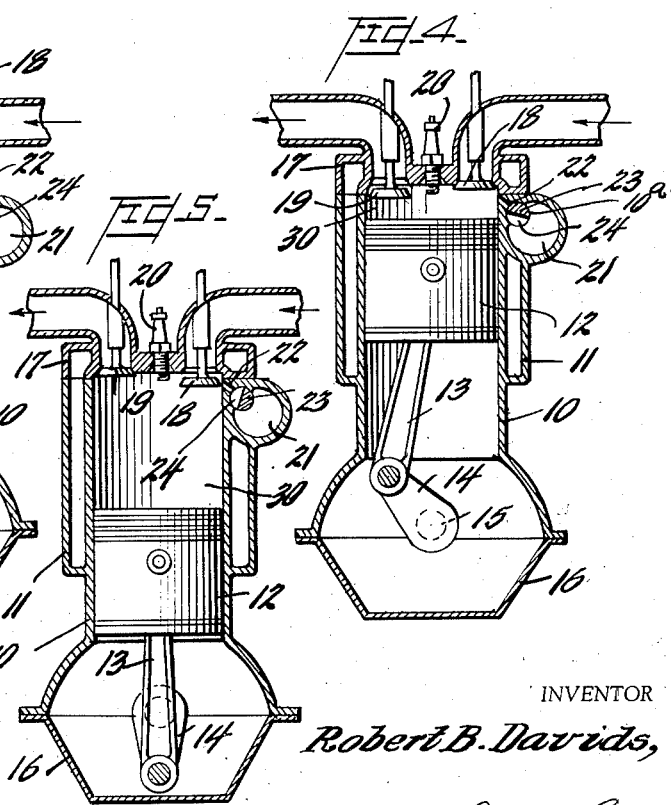
INVENTOR
Robert B. Davids,
BY
ATTORNEYS July 9, 1957 R. B. DAVIDS 2,798,467
SCAVENGING AND EXPANSION VOLUME EXTENDING TRAP
MECHANISM FOR INTERNAL COMBUSTION ENGINES
Filed April 28, 1954 2 Sheets-Sheet 2
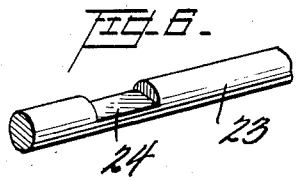
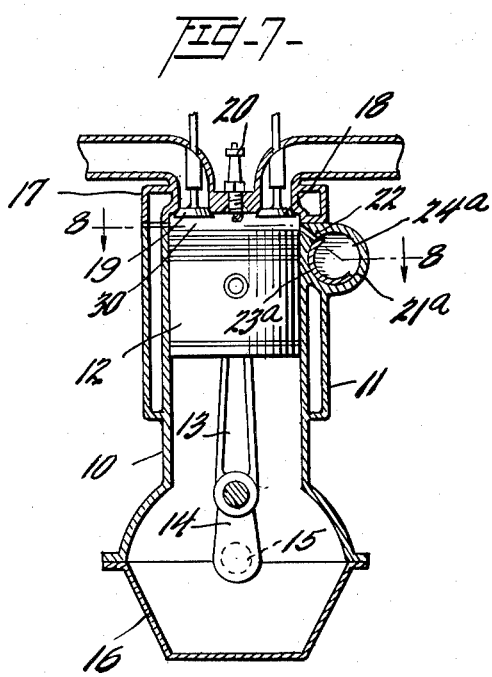
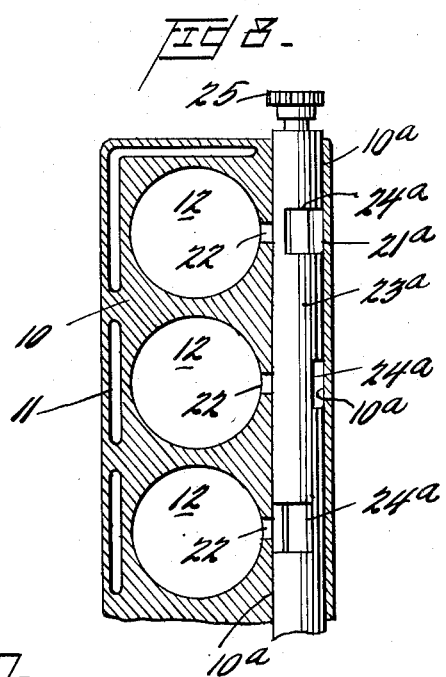
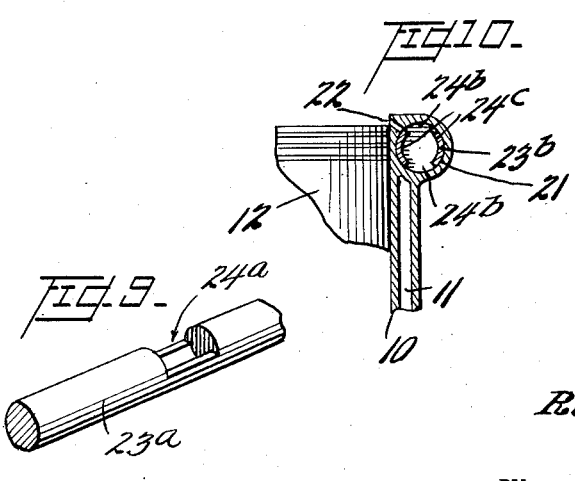
INVENTOR
Robert B. Davids,
BY
ATTORNEYS

United States Patent Office 2,798,467
Patented July 9, 1957

2,798,467

SCAVENGING AND EXPANSION VOLUME EXTENDING TRAP MECHANISM FOR INTERNAL COMBUSTION ENGINES

Robert B. Davids, Baltimore, Md.

Application April 28, 1954, Serial No. 426,268

5 Claims. (Cl. 123—76)

Automotive engineers have long sought to extract the last ounce of "push" from the expanding gases within internal combustion engines. While higher compression ratios tend to achieve this goal of increased power and efficiency, greater fuel consumption, higher temperatures, and increased internal stresses are necessary disadvantageous consequences, resulting in complex casting, machining and assembly problems.

One object of this invention is to provide the advantages of high compression without the normally attendant disadvantages by means of a novel "trap chamber" supplementary to and located adjacent each cylinder of an internal combustion engine in which chamber unexploded gases are compressed, trapped or retained and thereafter released at predetermined intervals during the conventional operation of a four cycle engine.

Another object of the invention is to provide for increased power per B. t. u. due to the increased volumetric expansion of the gases exploded within the combustion space of the engine cylinder.

A further object is the elimination of pre-ignition difficulties such as detonation or "pinking" and to obtain improved combustion through more perfect exhaust gas scavenging.

Another object is to reduce the necessary muffler provision in the engine because of the more complete expansion of the exploded gases within the cylinder.

A further object and advantage resulting from the invention is the lowering of the weight-to-horsepower ratio from that which is presently attainable.

The mechanism constituting the present invention essentially comprises a trap chamber disposed adjacent the top of each cylinder and communicating with the combustion or head space thereof through a port or passage which is alternately opened and closed by a rotary valve, the latter during a part of its revolution sealing off a portion of the compressed gas mixture, or compressed air as in the case of a Diesel engine, thereby retaining such segregated portion unexploded during the power and exhaust strokes of the piston. At approximately the top of the exhaust stroke the rotating trap chamber valve presents its open portion to the communicating passage permitting the entrapped, still compressed gas mixture or air in the trap chamber to escape into the cylinder head space, thus driving out the remainder of the combustion products through the exhaust valve which remains open until the intake stroke is about to begin. The exhaust valve then closes and the imprisoned charge of compressed gas mixture or air in the trap chamber continues to move into the cylinder head space until the pressure falls to approximately atmospheric, at which time the trap valve remains open and the intake valve opens to permit the complete filling of the cylinder head space with combustible mixture during the intake stroke of the piston.

I am aware that supplementary chambers in internal combustion engines have been used previously for broadly similar purposes. My invention, however, is an improvement upon such hitherto developed mechanisms in its ease and simplicity of construction, whereby it may be readily adapted to existing internal combustion engine fabrication techniques while fulfilling all of its desirable objects.

The instant invention is of value in the field of internal combustion engine research by providing an easily adjustable test engine which may be varied in construction for subsequent tests in accordance with information obtained through earlier tests. This with comparative simplicity of construction which permits easy casting and machining. The construction of the cooperating cylinder and trap chamber is adaptable to any type of cylinder head and poppet valve arrangement, and particularly to any desired pattern of valve timing which may be varied in accordance with test results.

The invention is of further value to the entire industry engaged in building efficient combustion engines for automotive or other purposes, particularly in industrial and agricultural power units where economy of fuel is imperative.

The above emphasized and other objects and advantages will become apparent in the following detailed description wherein is disclosed the preferred embodiments of my invention. Reference will also be made to the accompanying drawings, wherein:

Fig. 1 is a vertical sectional view taken through one cylinder of a conventional internal combustion engine of the four cycle type wherein my invention is embodied or incorporated, said view being taken substantially on the line 1—1 of Fig. 2.

Fig. 2 is a longitudinal horizontal sectional view taken through a segment of the cylinder block of an internal combustion engine, said view being taken substantially on the line 2—2 of Fig. 1.

Fig. 3 is a view similar to Fig. 1 but showing the relative positions of the synchronously driven piston and rotary trap valve at the bottom of the firing or power stroke of the piston.

Fig. 4 is a similar view showing the relative positions of the valve and pistons near the top of the piston exhaust stroke.

Fig. 5 is a similar view showing the relative position of the piston and valve at the conclusion or bottom of the intake stroke of the piston.

Fig. 6 is a perspective view of the rotary trap valve illustrated in Figs. 1 to 5 inclusive.

Fig. 7 is a view generally similar to Fig. 1, but at the conclusion or top of the piston compression stroke, and illustrating a modified form of rotary trap valve.

Fig. 8 is a horizontal sectional view similar to Fig. 2, taken substantially on the line 8—8 of Fig. 7.

Fig. 9 is a perspective view of the rotary trap chamber valve shaft or rod illustrated in Figs. 7 and 8.

Fig. 10 is a detail vertical section through the cylinder head of an internal combustion engine showing a further modification of the rotary trap valve and chamber.

Referring to the drawings, the cylinder or motor block 10 has a water jacket 11 and is mounted upon crankcase 16. Piston 12 is connected by means of a connecting rod 13 to crank 14 which is in turn fixed to or constitutes an integral part of crankshaft 15. At its head the cylinder block 10 is provided with a cover 17, having seatings for the usual intake valve 18, the exhaust valve 19, and ignition means 20, here shown as a convenional spark plug.

Machined into the cylinder block casting 10, near the top of and adjacent each cylinder is a chamber 21 (Figs. 1 and 2) of spheroidal or ellipsoidal form. The specific configuration of trap chamber 21 is relevant, for while it may be of rectangular or cubical shape, the greatest thermal efficiency may be obtained from the spherical or ellipsoidal forms in the handling of gaseous matter.

Communication between the cylinder bore and the chamber 21 is effected by means of a narrow slot, port or passageway 22 in the cylinder wall of the motor block 10. The opening or closing of the passage is controlled by the rotary valve which consists of a metal rod or valve shaft 23, rotatably journaled in a longitudinal bore 10a in the cylinder wall or motor block 10 and extending therefrom at one end thereof, said shaft extending between and through the trap chambers 21 at their points of juncture with the cylinder bore passageways 22. Valve shaft 23 is suitably notched, slotted or recessed at 24 so as to effectively seal off passageway 22 during approximately 180° of its rotation, and permitting communication or access therethrough to passageway 22 by means of said slotted shaft portion, during the remainder of the shaft revolution.

Valve shaft 23 is constantly driven by convenient means, for example by means of a gear 25 mounted upon the outer extremity of valve shaft 23 meshing with an idler gear or gears 26, which in turn mesh with gear 27 fixed to crankshaft 15. The synchronized positive train of speed reduction gearing 25, 26 and 27 is conventionally and schematically illustrated in Figs. 1 and 2 as constituting an endless chain 26. The gear reduction train is such that the valve shaft 23 completes one revolution for every two revolutions of the crank shaft 15, or a speed ratio of 1 to 2.

A modification of the rotary valve member is illustrated in Figs. 7, 8 and 9. The solid cylindrical valve shaft 23a is of relatively greater diameter, rotatably secured in and substantially filling the bored channel 10a and also extends longitudinally through and beyond the cylinder motor block 10. The trap chambers 21a are of any desired shape, size or cross-sectional configuration and are each defined partially by the wall of the bored channel 10a, and partially by the enclosing walls of the cutaway portion 24a of the valve shaft 23a, as illustrated in these figures.

The valve shaft 23a and crank shaft 15 as in the instance of the first described embodiment of Fig. 1, have a speed ratio of 1 to 2. This modified embodiment has the advantage over the embodiment of Fig. 1 of permitting changes in the compression by employing different valve shafts having valve pockets of larger or smaller capacity and of different shapes having various cross-sectional configurations, in accordance with testing conditions and results obtained.

Another modification of the rotary valve is shown in Fig. 10. The otherwise solid cylindrical valve shaft 23b is chambered or cut away so as to provide two diametrically opposed shaft openings 24b and two arcuate shaft closure portions 24c controlling communication through the passageway 22 during each revolution of the valve shaft. The ratio of the driving gear mechanism in this alternate embodiment would necessarily be 1 to 4.

The modifications of the valve shaft and trap chamber construction shown in Figs. 7, 8, 9 and 10 possess a slight advantage over that disclosed in Figs. 1 and 2, in that the respective rotary valve shafts 23a and 23b may be more readily machined to provide notches or pockets of larger or smaller capacity of desired configuration to permit changes in the trap chamber volume, for purposes of experiment, testing, etc.

The operation of the engine is as follows:

(1) The intake stroke: As piston 12 starts its downward movement, intake valve 18 opens to admit a charge of fuel into the variable cylinder head or combustion space 30. At this time port or passageway 22 is open, as valve shaft 23 is timed to uncover the passageway shortly before the end of the exhaust stroke (Fig. 4). Thus a part or proportionate amount of the admitted gaseous charge flows through passageway 22 into the trap chamber 21.

(2) The compression stroke: Intake valve 18 closes, while the entrance port 22 to trap chamber 21 remains open. As the piston advances or rises, the gaseous combustible mixture charge in both the cylinder and the trap chamber is compressed. Shortly before the top or completion of this compression stroke (Fig. 1) and before ignition of the mixture, rotating valve shaft 23 closes the passageway 22, thereby sealing off a portion of the compressed and unexploded gases in the trap chamber 21.

(3) The power stroke: During ignition and the resulting forcible downstroke of the piston, trap chamber 21 remains sealed, the gases therein being retained in their compressed and unexploded state (Fig. 3).

(4) The exhaust stroke: Exhaust valve 19 now opens, allowing the normal partial scavenging of the burnt charge by the upstroke of the piston (Fig. 4). Just prior to completion of the stroke and before the closing of exhaust valve 19, valve shaft 23 presents its notched or open face 24 to passageway or port 22, permitting the imprisoned compressed gases to forcibly escape from the trap chamber 21 into the combustion space 30, thus serving to drive out the remaining increment of the combustion products through and immediately prior to the closing of exhaust valve 19. Intake valve 18 then opens to reinitiate or repeat the cycle in the manner and for the purposes above described.

From the foregoing it will be understood that the principle underlying this invention may be defined viz: it is not high compression in itself which imparts increased power and efficiency to the engine, but rather it is the increased volume of expansion relative to the compressed charge, which might be termed the expansion ratio, which obtains this desirable result of imparting increased power to the engine.

In more detail, high compression of the gases within the cylinder head space prior to ignition thereof, in and of itself does not materially increase the operating efficiency of an internal combustion engine. Such high compression ratios tend to cause undesirable pre-ignition or fouling of ignition means, such as spark plugs, as well as substantially increasing the cost of the engine by requiring stronger structural components and extremely intricate and careful machining to meet the tolerances necessary. Rather it is the expansion of the gaseous mixture, after ignition, from its compressed volume to the maximum volume available within the cylinder head space, which determines the efficiency of the engine.

This is true because no work output is obtained during the compression stroke of the engine. Work output is achieved solely by the power or gas expansion stroke of the engine, at which time the cylinder head space is increased from its minimum to its maximum volume.

Expansion is a cooling process and gases warmer in temperature than their surroundings will continually seek to expand and cool. This is the principle employed in an internal combustion engine. The more heat energy that can be converted into useful work through greater expansion of the compressed ignited gases within the cylinder head space, the more efficient the engine, and the less heat energy contained in the products of combustion lost through the exhaust of the engine. As an obvious corollary, the engine operates at a proportionately cooler temperature.

In a conventional internal combustion engine, an expansion ratio of 11:1, for example, can only be obtained by providing the relatively high compression ratio of 11:1. In the novel engine of my invention, provided with the described trap chamber and the disclosed timing of valve operation therefor, an engine having, for example, a 6:1 compression ratio can provide the desired 11:1 expansion ratio, thus: Assume the maximum cylinder head space including the open trap chamber 21 (when the piston is at the bottom of its stroke) is 12 cubic inches, of which 1 cubic inch comprises the volume of the trap chamber 21. The minimum cylinder head space, including the volume of the trap chamber with trap chamber passageway 22, open and the piston at the top of its stroke, is 2 cubic inches. Since passageway 22 to the trap chamber 21 is open during the compression stroke, the compression ratio of the engine will be 12:2, or 6:1. Substantially at the top of the compression stroke, the trap chamber is sealed off by rotation of valve shaft 23 to its valve closing position, thus sealing therein one-half of the compressed and unexploded gaseous mixture. The cylinder head space with the remaining one-half of the compressed unexploded gaseous mixture therein is now one cubic inch. Said remaining gaseous mixture is ignited and the power or expansion stroke of the piston commences, continuing to its lowermost point of travel (Fig. 3), at which time there are 11 cubic inches of space above the top of the piston, the trap chamber 2 remaining sealed off throughout this stroke. Thus the one cubic inch of compressed gaseous mixture within the cylinder head space has expanded to 11 cubic inches, or a gas expansion ratio of 11:1.

As described, the invention achieves the desirable end and advantages hereinabove emphasized, in the increased volume of expansion relative to the compressed charge, and the more efficient scavenging of exhaust gases.

From the foregoing it will be understood that the utmost useful expansion of ignited gas mixtures under compression is the constantly sought desideratum. Therefore means are provided by this invention for increase at will of the expansion ratio while holding the compression ratio constant.

The following is another illustration to clarify the distinction between the expansion and compression ratios, and to establish the peculiar utility of this invention in this regard.

Assuming a simple conventional engine cylinder with flat cylinder and piston heads with a predetermined compression ratio of 8 to 1, and a piston stroke of 3½ inches, the compressed gas mixture will have an axial dimension of ½ inch or ⅛ of the axial dimension of the cylinder—4 inches—at the bottom of the piston stroke.

This is as in the conventional engine without an adjacent trap chamber.

Now let us reduce the axial length of the space above the piston at the top of the stroke by one-half, storing one half of the compressed gas mixture inert in a trap chamber equal in volume to the gas mixture retained in the cylinder. The compression ratio will remain constant in both chambers. The expansion ratio will, because of this entrapment of one-half of the compressed charge, change and may be calculated as follows:

The axial length of the ignited charge will now be ¼ inch and the axial length of the cylinder at the bottom of the stroke will be 3.5 plus .25 inch or 3.75 inches. The expansion ratio will be 3.75 divided by .25 or 15 to 1. The ignited charge will have expanded fifteen times its compressed volume as compared to eight times in a conventional engine.

In the immediately foregoing example wherein the axial space above the piston is reduced by one-half, i. e. to ¼ inch, the trap chamber is constructed so that its volume is equivalent to the missing ¼ inch of axial cylinder space. Therefore the compression ratio available when the chamber is open remains at 8 to 1. However, when it is closed as during the power stroke, the expansion ratio will be 15 to 1. Were there no trap chamber present in the engine and the axial cylinder space were reduced from ½ to ¼ inch, the compression ratio is then 15 to 1, i. e. from a ratio of ¼ inch to a total of 3¾ inches.

From the above arbitrary examples it will be apparent that the amount of air and heat units in the ignited gaseous charge will be reduced proportionately. The amount of the enriched mixture may be increased, however, at will by (a) lengthening the piston stroke; or (b) increasing the cylinder bore; or (c) increasing both (a) and (b) with a corresponding increase in the volume of the trap chamber.

The relative volume of the trap chamber is determined by the ends desired. If just enough compressed air or gas mixture is required to effect scavenging, the volume of the trap chamber 21 relative to the cylinder head space 30 will be small; if increased expansion of the exploded mixture is the major objective, it will be relatively much larger.

The employment of a positively driven rotary valve is of importance. It is essential that whatever type valve is used must give effective sealing from gas pressures in the cylinder and in the trap chamber. This is not possible with any known type of spring actuated or poppet valve, as the spring pressure on such a valve is usually about fifty pounds, or much less than the pressure developed in the trap chamber or cylinder head. In addition, the spring pressure would require considerably more power to operate. The use of a rotary valve as described obviates all these difficulties formerly attendant upon any such supplementary chamber device, affording simplicity of casting and machining, positive uniform control, and efficiency of operation.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

What is claimed is:

1. In a four cycle internal combustion engine including a cylinder having a combustion space provided with controlled intake and exhaust ports and a reciprocable piston having a driving connection with a crank shaft, the combination of a trap chamber adjacent said combustion space, a single passageway communicably connecting said trap chamber and said combustion space, a rotary valve controlling communication between said chamber and said combustion space through said passageway, means operating in timed synchronism with the reciprocation of said piston to open said valve for substantially the duration of the compression stroke of said piston to compress within said chamber a part of the gaseous mixture admitted into said combustion space through said intake port during a previous intake stroke, said valve opening means thereafter operating to close said valve for the duration of the succeeding power stroke to trap said compressed mixture part in said chamber, means for igniting the remaining untrapped part of the compressed mixture in said combustion space to expand the same during said succeeding power stroke to a greater volume than its initial uncompressed volume, said valve opening means maintaining said valve closed for the greater portion of the succeeding exhaust stroke, and thereafter again opening said valve toward the end of said exhaust stroke to release the said trapped part of the compressed gaseous mixture into said combustion space immediately prior to the closing of said exhaust port to scavenge the remaining unexhausted combustion products, said valve opening means thereafter maintaining said valve open for the entire succeeding intake stroke of said piston, said controlled intake port remaining closed during the initial portion of said intake stroke until the gaseous pressure in said combustion space is reduced to substantially atmospheric.

2. The combination as defined in claim 1, wherein the wall of said trap chamber is of continuously curved configuration.

3. In a four-cycle internal combustion engine including a cylinder having a combustion space provided with controlled intake and exhaust ports and a reciprocable piston having a driving connection with a crank shaft, said engine having a continuous sequential operating cycle comprising an intake stroke, compression stroke, power stroke and exhaust stroke, the combination of a trap chamber disposed adjacent said combustion space, a single passageway communicably connecting said trap chamber and combustion space, a rotary valve controlling communication between said chamber and said combustion space through said passageway, and means operating in timed synchronism with the reciprocation of said piston to open said valve immediately preceding the end of said exhaust stroke and maintaining said valve open for the succeeding intake and compression strokes of said operating cycle during which said controlled intake port remains closed for the initial portion of the intake stroke until the gaseous pressure in said combustion space is reduced to substantially atmospheric, said means thereafter closing said valve for the next succeeding power and exhaust strokes of said operating cycle.

4. In a four cycle internal combustion engine comprising a motor block having a cylinder provided with a combustion space having controlled intake and exhaust ports and a reciprocable piston having a driving connection with a crankshaft, a cylindrical bore in said motor block spaced from and extending transversely of said cylinder, a single passageway communicably connecting said bore and said combustion space, a rotatable valve shaft journaled in said bore for controlling communication between said bore and said combustion space through said passageway, said valve shaft having a cutaway portion disposed adjacent said passageway to constitute a substantially cylindrical trap chamber in part defined by said cut away shaft portion and in part by the wall of said bore, means operating in timed synchronism with the reciprocation of said piston to rotate said valve shaft and open said valve for substantially the duration of the compression stroke of said piston to compress within said chamber a part of the gaseous mixture admitted into said combustion space through said intake port during a previous intake stroke, said shaft rotating means thereafter closing said valve for the duration of the succeeding power stroke to trap said compressed mixture part in said chamber, said shaft rotating means maintaining said valve closed for the greater portion of the succeeding exhaust stroke, and thereafter again opening said valve toward the end of said exhaust stroke to release the said trapped part of the compressed gaseous mixture into said combustion space immediately prior to the closing of said exhaust port to scavenge the remaining unexhausted combustion products, said shaft rotating means thereafter maintaining said valve open for the entire succeeding intake stroke of said piston, said controlled intake port remaining closed during the initial portion of said intake stroke until the gaseous pressure in said combustion space is reduced to substantially atmospheric.

5. In a four cycle internal combustion engine including a cylinder having a combustion space provided with controlled intake and exhaust ports and a reciprocable piston having a driving connection with a crankshaft, the combination of a trap chamber adjacent said combustion space, a single passageway communicably connecting said chamber and said combustion space, a rotatable shaft extending through said chamber adjacent said passageway, a longitudinal peripheral portion of said rotatable shaft being recessed to constitute a rotary valve adjacent said passageway for controlling communication between said chamber and said combustion space, means operating in timed synchronism with the reciprocation of said piston to rotate said shaft and open said valve for substantially the duration of the compression stroke of said piston to compress within said chamber a part of the gaseous mixture admitted into said combustion space through said intake port during a previous intake stroke, said shaft rotating means thereafter closing said valve for the duration of the succeeding power stroke to trap said compressed mixture part in said chamber, said shaft rotating means maintaining said valve closed for the greater portion of the succeeding exhaust stroke, and thereafter again opening said valve toward the end of the exhaust stroke to release the said trapped part of the compressed gaseous mixture into said combustion space immediately prior to the closing of said exhaust port to scavenge the remaining unexhausted combustion products, said shaft rotating means thereafter maintaining said valve open for the entire succeeding intake stroke of said piston, said controlled intake port remaining closed during the initial portion of said intake stroke until the gaseous pressure in said combustion space is reduced to substantially atmospheric.

References Cited in the file of this patent

UNITED STATES PATENTS

| 1,384,133 | Howe | July 21, 1921 |
| 1,525,956 | Sargent | Feb. 10, 1925 |
| 1,568,638 | Summers | Jan. 5, 1926 |
| 1,682,305 | Nilson | Aug. 28, 1928 |
| 1,788,076 | Zaikowsky | Jan. 6, 1931 |
| 1,839,791 | Lawrence | Jan. 5, 1932 |
| 2,352,824 | Essl | July 4, 1944 |

FOREIGN PATENTS

| 152,446 | France | June 21, 1904 |
| 126,155 | Great Britain | May 8, 1919 |